US012341659B2

(12) United States Patent
Holley

(10) Patent No.: US 12,341,659 B2
(45) Date of Patent: Jun. 24, 2025

(54) METHODS AND SYSTEMS FOR AUTOMATED CONFIGURATIONS OF MEDIA PRESENTATION DEVICES

(71) Applicant: DISH Network L.L.C., Englewood, CO (US)

(72) Inventor: Erik Holley, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 236 days.

(21) Appl. No.: 17/445,143

(22) Filed: Aug. 16, 2021

(65) Prior Publication Data

US 2021/0377120 A1    Dec. 2, 2021

Related U.S. Application Data

(63) Continuation of application No. 16/790,879, filed on Feb. 14, 2020, now Pat. No. 11,121,924, which is a
(Continued)

(51) Int. Cl.
*H04L 41/0813*     (2022.01)
*H04L 41/08*       (2022.01)
(Continued)

(52) U.S. Cl.
CPC ...... *H04L 41/0886* (2013.01); *H04L 41/0813* (2013.01); *H04L 41/0823* (2013.01);
(Continued)

(58) Field of Classification Search
CPC ............. H04L 41/0886; H04L 41/0813; H04L 41/0823; H04L 67/34; H04L 41/22;
(Continued)

(56) References Cited

U.S. PATENT DOCUMENTS 6,097,441 A    8/2000  Allport
7,647,612 B1 * 1/2010  Stark .................. H04N 7/17318
                                              725/63
(Continued)

FOREIGN PATENT DOCUMENTS

WO    2010030610 A1    3/2010
WO    2013132562 A1    9/2013
WO    2016094130 A1    6/2016

OTHER PUBLICATIONS

The difference between MPEG-4 and H.264 by Velleman, published Sep. 11, 2009, pp. 1. (Year: 2009).*
(Continued)

*Primary Examiner* — Stephen S Hong
*Assistant Examiner* — Ahamed I Nazar
(74) *Attorney, Agent, or Firm* — KW Law, LLP

(57) ABSTRACT

Methods and systems are provided for configuring or customizing settings or parameters of different media devices for compatible operations in an automated manner. An exemplary method of configuring a device for presenting media content in conjunction with a second device involves a client device detecting the device on a wireless network, identifying performance characteristics associated with the second device coupled to the device, and automatically configuring the device for operation with the second device via the wireless network and in a manner that is influenced by the performance characteristics associated with the second device. In this regard, one or more configurable parameters or settings maintained at the device and that influence its operation may be modified via the wireless network to correspond to performance characteristics of the second device, thereby facilitating compatible interoperation with the second device.

19 Claims, 5 Drawing Sheets

Related U.S. Application Data continuation of application No. 15/975,657, filed on May 9, 2018, now Pat. No. 10,616,061.

(51) Int. Cl.
  *H04L 41/0823* (2022.01)
  *H04L 41/22* (2022.01)
  *H04L 67/00* (2022.01)
  *H04N 21/41* (2011.01)

(52) U.S. Cl.
  CPC ......... *H04L 67/34* (2013.01); *H04N 21/4112* (2020.08); *H04L 41/22* (2013.01)

(58) Field of Classification Search
  CPC ... H04L 65/1094; H04L 67/303; H04L 69/24; H04L 65/1059; H04L 12/2805; H04N 21/4112; H04N 21/43637; H04N 21/44227
  USPC ....................................................... 715/723
  See application file for complete search history.

(56) References Cited

U.S. PATENT DOCUMENTS

| | | |
|---|---|---|
| 8,156,427 B2 | 4/2012 | Graham et al. |
| 8,350,971 B2 | 1/2013 | Malone et al. |
| 8,646,013 B2 | 2/2014 | Curtis et al. |
| 8,686,013 B2 | 4/2014 | Lyga |
| 9,338,231 B2 | 5/2016 | Abramov et al. |
| 9,497,231 B2 | 11/2016 | Shankarraman |
| 9,854,467 B2 | 12/2017 | Burns et al. |
| 2004/0024913 A1 | 2/2004 | Ikeda |
| 2005/0122335 A1 | 6/2005 | MacInnis et al. |
| 2007/0083888 A1 | 4/2007 | Liebhold |
| 2009/0033390 A1 | 2/2009 | Kim et al. |
| 2009/0091655 A1 | 4/2009 | Russell et al. |
| 2009/0180755 A1 | 7/2009 | Kanemaru et al. |
| 2009/0256967 A1 | 10/2009 | Suzuki |
| 2010/0060549 A1 | 3/2010 | Tsern |
| 2010/0064332 A1 | 3/2010 | Krikorian et al. |
| 2010/0082137 A1 | 4/2010 | Suzuki et al. |
| 2010/0082567 A1 | 4/2010 | Rosenblatt et al. |
| 2010/0268832 A1 | 10/2010 | Lucas et al. |
| 2011/0154393 A1 | 6/2011 | Ra |
| 2011/0191456 A1* | 8/2011 | Jain ................ H04L 67/51 709/228 |
| 2011/0258665 A1* | 10/2011 | Fahrny .............. H04N 21/4516 725/47 |
| 2012/0200774 A1 | 8/2012 | Ehlers |
| 2012/0278837 A1 | 11/2012 | Curtis et al. |
| 2013/0128119 A1 | 5/2013 | Madathodiyil et al. |
| 2013/0208186 A1* | 8/2013 | Malone ............. H04N 21/4227 348/563 |
| 2013/0304804 A1 | 11/2013 | Glasser |
| 2014/0109144 A1 | 4/2014 | Asnis et al. |
| 2014/0281006 A1* | 9/2014 | Major ................. H04N 21/637 709/231 |
| 2014/0376873 A1 | 12/2014 | Tanaka et al. |
| 2015/0271257 A1* | 9/2015 | Abramov ............ H04L 41/0866 709/222 |
| 2016/0188311 A1* | 6/2016 | Richard .................... G06F 8/61 717/176 |
| 2016/0248820 A1 | 8/2016 | Abramov et al. |
| 2016/0381202 A1 | 12/2016 | Koo |
| 2017/0041351 A1* | 2/2017 | Shankarraman .... H04L 65/1069 |
| 2017/0208364 A1* | 7/2017 | Glazier ................ H04N 21/485 |
| 2019/0075034 A1* | 3/2019 | Seo ........................ H04L 67/63 |

OTHER PUBLICATIONS

European Patent Office, Communication pursuant to Article 94(3) EPC for Application No. 15 819 916.6-1208 issued Apr. 30, 2018.

International Search Report and Written Opinion, International Application No. PCT/US2015/063218, mailed Feb. 19, 2016.

The International Bureau of WIPO, International Preliminary Report on Patentability for International Application No. PCT/US2015/063218 mailed Jun. 22, 2017.

European Patent Office, International Search Report and Written Opinion issued in IA App. No. PCT/US2019/028842 dated Aug. 20, 2019.

European Patent Office, International Preliminary Report on Patentability issued in IA App. No. PCT/US2019/028842 dated Nov. 19, 2020.

* cited by examiner

METHODS AND SYSTEMS FOR AUTOMATED CONFIGURATIONS OF MEDIA PRESENTATION DEVICES

CROSS-REFERENCE TO RELATED APPLICATION(S)

This application is a continuation of U.S. patent application Ser. No. 16/790,879, filed Feb. 14, 2020, which is a continuation of U.S. patent application Ser. No. 15/975,657, filed May 9, 2018.

TECHNICAL FIELD

Embodiments of the subject matter described herein relate generally to media presentation devices, and more particularly, to automatically configuring devices involved in media presentation for compatible operations with one another.

BACKGROUND

Modern home entertainment systems may include numerous different types of standalone devices, such as, for example, televisions, receivers, set-top boxes, streaming devices or streaming sticks, speakers, soundbars, and the like. Manually configuring and optimizing individual components of a home entertainment system for compatible operations with the other components can be time consuming as well as increasingly complex with continual technological advances and increased capabilities supported by newer devices. As a result, technologically unsophisticated users can become frustrated or discouraged from setting up a home entertainment system. Accordingly, it is desirable to reduce the time and manual burdens associated with analyzing and configuring home entertainment systems. Other desirable features and characteristics will become apparent from the subsequent detailed description and the appended claims, taken in conjunction with the accompanying drawings and the foregoing technical field and background.

BRIEF SUMMARY

Embodiments of systems and related automated configuration methods are provided. An exemplary method of configuring a device for presenting media content involves a client device detecting the device on a wireless network, identifying performance characteristics associated with a second device coupled to the device, and automatically configuring the first device via the wireless network for operation with the second device in a manner that is influenced by the performance characteristics associated with the second device.

In another embodiment, a system is provided that includes a first media presentation device coupled to a wireless network, a second media presentation device coupled to the first media presentation device, and a client device coupled to the wireless network to detect the first media presentation device on the wireless network, identify performance characteristics associated with the second media presentation device, and automatically configure the first media presentation device, via the wireless network, for operation with the second media presentation device in a manner that is influenced by the performance characteristics associated with the second media presentation device.

In yet another embodiment, a method of configuring a media presentation system for presenting media content involves detecting, by a client device, a plurality of media presentation devices communicatively coupled to one or more wireless networks, obtaining, by the client device, performance characteristics associated with the plurality of media presentation devices, and automatically configuring, by the client device via the one or more wireless networks, a first media presentation device of the plurality of media presentation devices for operation with a second media presentation device of the plurality of media presentation devices paired with the first media presentation device based on a relationship between the respective performance characteristics associated with the first media presentation device and the performance characteristics associated with the second media presentation device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
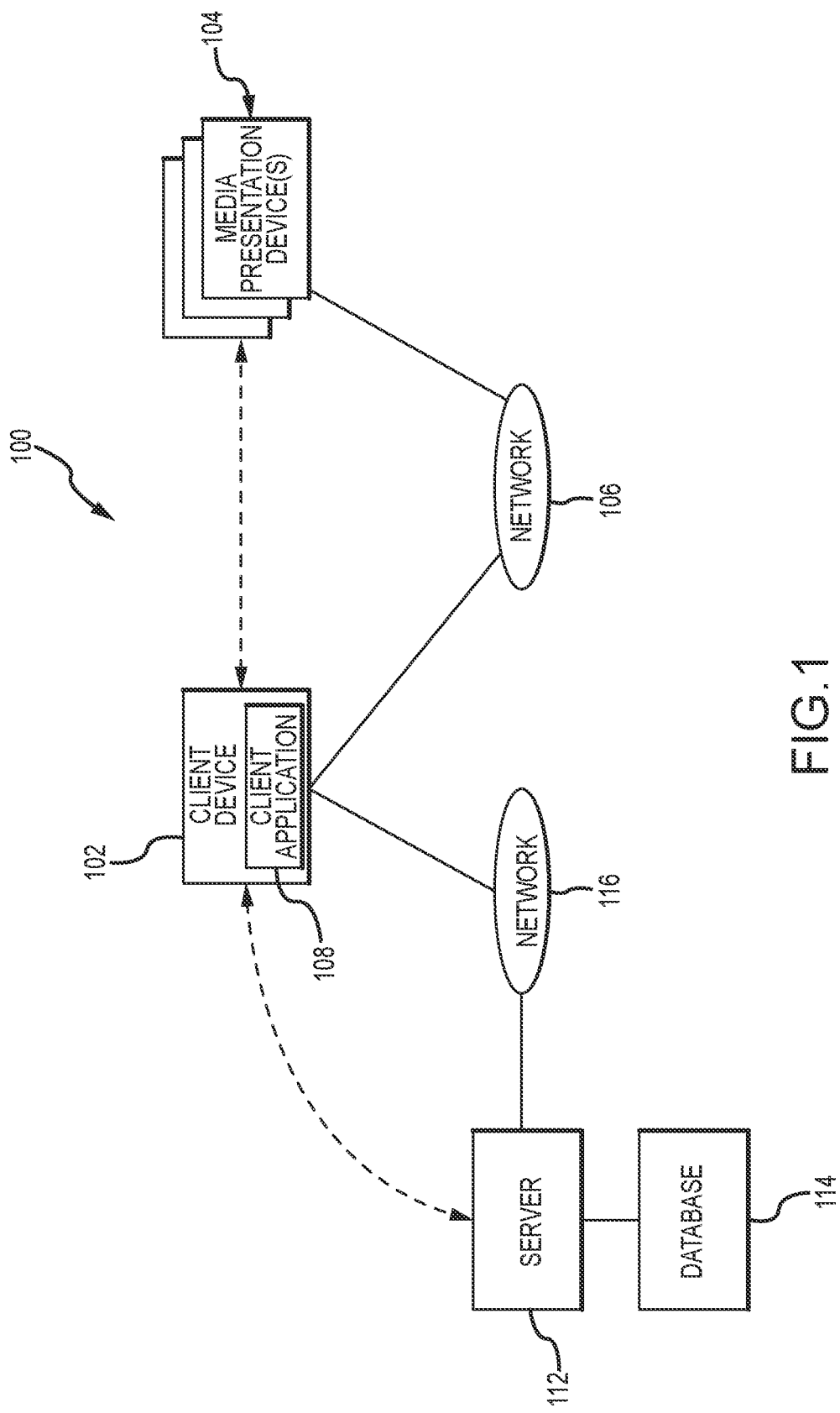
FIG. 1 depicts a block diagram of an exemplary embodiment of a media presentation system.

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to configuring different devices involved with presenting media content for compatible operations with one another in an automated manner. As used herein, "media content," "media program," "multimedia content," or variants thereof should be understood as referring to any audio-visual programming or content in any streaming, file-based or other format. The media content generally includes data that, when processed by a media player or decoder, allows the media player or decoder to present a visual and/or audio representation of the corresponding program content to a viewer (i.e., user of a device including the media player or decoder). In one or more embodiments, a media player can be realized as a piece of software that plays multimedia content (e.g., displays video and plays audio).

In exemplary embodiments described herein, an automated configuration application executing on a client electronic device detects or otherwise identifies one or more other electronic devices capable of presenting (or facilitating presentation of) media content that are within communications range of the client electronic device on a wireless network. The automated configuration application identifies or otherwise determines sets or combinations of the identified devices that are coupled together or otherwise interoperate with one another. For example, for a pair of devices, the automated configuration application identifies performance characteristics associated with at least one of the devices of the pair, and based on those performance characteristics, automatically configures the other device of the pair in a manner that is influenced by the performance characteristics associated with the first device. In this regard, the automated configuration application may cause the client electronic device to transmit or otherwise provide commands or instructions to one of the devices to alter its configurations or settings that dictate respective operation of that device to match the performance characteristics of the other device. For example, when one device of a pair of devices is only capable of supporting a particular data rate, the automated configuration application may cause the client electronic device to transmit commands or instructions to the other device of the pair to alter its own configurations or settings so that it does not attempt to provide media content at a higher data rate. As another example, the automated configuration application may instruct or command a device of a pair of devices to alter one or more communications configuration settings to improve communications with the other device of the pair.

In exemplary embodiments, the automated configuration application provides one or more graphical user interface (GUI) displays on the client device that allow a user to manually review or assist the automated configuration application in configuring any number of devices involved in media presentation that are in wireless communication with the client device. In this regard, for media presentation devices that are not communicatively coupled to the client device or are otherwise unable to be configured via the client device, the automated configuration application may provide GUI displays that include instructions, recommendations, instructions, or other feedback or information that may facilitate the user configuring those devices for improved operations. The automated configuration application may also provide recommendations or suggestions based on the performance characteristics or capabilities of the various devices detected by the automated configuration application, such as, for example, recommended changes to one or more subscription services to better suit the performance characteristics of the detected devices.

Turning now to FIG. 1, an exemplary media presentation system 100 includes, without limitation, a client device 102 and a plurality of different electronic devices 104 involved with one or more aspects of presenting media content, such as, for example, receiving, downloading, streaming, decoding, transcoding and/or reproducing the media content. Accordingly, for purposes of explanation, but without limitation, the electronic devices 104 may alternatively be referred to herein as media presentation devices. In exemplary embodiments, at least one of the media presentation devices 104 is communicatively coupled to the client device 102 via one or more wireless networks 106, such as, for example, a wireless local area network, a wireless personal area network, a fixed wireless network, a wide area network, a NarrowBand Internet of Things (NB-IoT) network, or the like. It should be appreciated that FIG. 1 is a simplified representation of a media presentation system 100 for purposes of explanation and is not intended to be limiting.

The client device 102 generally represents an electronic device capable of communicating with one or more of the media presentation devices 104 via a network 106. In practice, the client device 102 can be realized as any sort of personal computer, mobile telephone, tablet or other network-enabled electronic device. In exemplary embodiments, the client device 102 includes a display device, such as a monitor, screen, or another conventional electronic display, capable of graphically presenting data and/or information along with one or more user input devices capable of receiving input from the user of the client device 102, such as a touchscreen, a touch panel, a mouse, a joystick, a directional pad, a motion sensor, or the like. The illustrated client device 102 executes or otherwise supports a client application 108 that supports communications with the media presentation devices 104 and automatically configuring one or more of the media presentation devices 104, as described in greater detail below. In exemplary embodiments, the client application 108 is realized as a local application executing on or at the client device 102.

The media presentation devices 104 generally represent any sort of electronic devices capable of receiving and/or presenting media content from another device or network. For example, the media presentation devices 104 could include one or more of a television, monitor, liquid crystal display (LCD), light emitting diode (LED) display, plasma display, or other device capable of reproducing video or audiovisual media content received from a network (e.g., network 106, a satellite distribution network, a broadcast network, or the like) or via another device (e.g., a set-top box or the like). In this regard, one or more of the media presentation devices 104 could be realized as a set-top box, a receiver, an over-the-top (OTT) streaming device, a streaming stick, a gaming console, or the like that is coupled to a television to receive media content and provide the media content to the television. The media presentation devices 104 could also include one or more routers, modems, firewall devices, personal computers, tablets or other network-enabled electronic devices. Additionally, the media presentation devices 104 could include one or more speakers, sound bars, or other devices capable of reproducing the audio portion of media content received from another device 104 or network.

In exemplary embodiments, the client device 102 is communicatively coupled to a remote device 112 via a communications network 116, which may be logically distinct or separate from the communications network 106, such as, for example, a cellular network, the Internet, or the like. The remote device 112 generally represents a computing device, computing system or another combination of processing logic, circuitry, hardware, and/or other components configured to support the automated configuration processes, tasks, operations, and/or functions described herein, and for purposes of explanation, the remote device 112 may alternatively be referred to herein as a server. The server 112 is coupled to a database 114 that stores or otherwise maintains information about various types of media presentation devices 104, such as, for example make and model information, performance characteristics, configurable settings or other configuration parameters for retrieval by the client application 108 via the server 112, as described in greater detail below in the context of FIG. 3.

Figure 2:
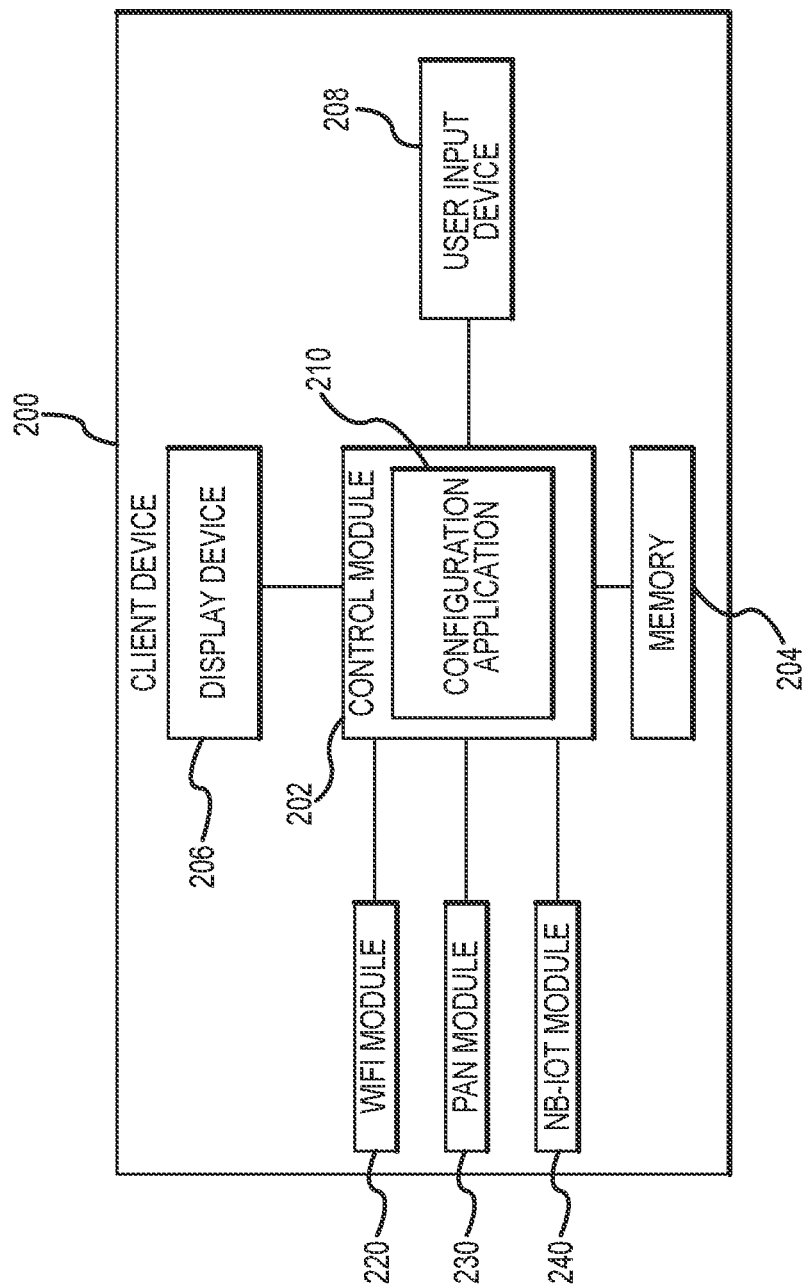
FIG. 2 depicts a block diagram of an exemplary embodiment of a client device suitable for use in the media presentation system of FIG. 1.

FIG. 2 depicts an exemplary embodiment of an electronic device 200 suitable for use as the client device 102 in the media presentation system 100 of FIG. 1. The client device 200 includes, without limitation, a control module 202, a data storage element 204 (or memory), a display device 206, one or more user input devices 208, and a plurality of different communications modules 220, 230, 240. In exemplary embodiments, the different communications modules 220, 230, 240 are configured to support communications over different communications networks, as described in greater detail below. It should be appreciated that FIG. 2 is a simplified representation of a client device 200 for purposes of explanation and is not intended to be limiting.

The control module 202 generally represents the hardware, circuitry, logic, firmware and/or other components of the client device 200 configurable to support the automated configuration processes and various additional tasks, operations, functions and/or operations described herein. Depending on the embodiment, the control module 2-202 may be implemented or realized with a general purpose processor, a microprocessor, a controller, a microcontroller, a system on a chip, an application specific integrated circuit, a state machine, a content addressable memory, a field programmable gate array, any suitable programmable logic device, discrete gate or transistor logic, discrete hardware components, or any combination thereof, designed to perform the functions described herein. In this regard, the steps of a method or algorithm described in connection with the embodiments disclosed herein may be embodied directly in hardware, in firmware, in a software module executed by the control module 202, or in any practical combination thereof. In exemplary embodiments, the control module 1502 includes or otherwise accesses the memory 204, which may be realized using any sort a random access memory (RAM), read only memory (ROM), flash memory, magnetic or optical mass storage, or any other suitable non-transitory short or long term data storage or other computer-readable media, and/or any suitable combination thereof. The memory 204 stores computer-executable programming instructions that, when read and executed by the control module 202, cause the control module 202 to implement or otherwise generate a configuration application 210 that supports or otherwise performs various tasks, operations, functions, and processes described herein.

The display device 206 may be realized as any sort of electronic display capable of graphically displaying information or other data associated with operation of the client device 200 under control of the control module 202. The user input device(s) 208 may include or be realized as one or more of the following user input devices: a keypad, touchpad, keyboard, mouse, touch panel (or touchscreen), joystick, knob, line select key or another suitable device adapted to receive input from a user, such as a microphone, audio transducer, audio sensor, or another audio input device.

In exemplary embodiments, the communications modules 220, 230, 240 are configured to support wireless communications in accordance with a wireless communications protocol or specification that is different from that of the other communications modules 220, 230, 240. For example, a first wireless communications module 220 may be configured to support communications over a wireless local area network (WLAN) or other network in accordance with an IEEE 802.11 specification (e.g., WiFi). A second wireless communications module 230 may be configured to support communications over a personal area network (PAN) or other network in accordance with an IEEE 802.15 specification, such as, for example, Bluetooth®, ZigBee® radio frequency for consumer electronics (RF4CE), or the like. Yet another wireless communications module 240 may be configured to support communications over a fixed wireless network, a wide area network, a NB-IoT network, or the like. The wireless communications modules 220, 230, 240 generally include at least one antenna and a radio frequency (RF) core configured to convert digital baseband signals to analog radio frequency signals to be transmitted via the respective antenna and convert analog radio frequency signals received via the respective antenna to corresponding digital baseband signals. In this regard, each RF core may include one or more mixers, frequency doublers, frequency dividers, baluns, mixers, amplifiers, transmitters, receivers, transceivers, or the like. In some embodiments, antennas may be shared, combined, or otherwise multiplexed across more than one wireless communications modules 220, 230, 240 or otherwise utilized to support more than one communications protocol.

Referring to FIGS. 1-2, in one or more embodiments, the configuration application 210 supports communications with a counterpart application or software process executing on one or more of the media presentation devices 104. In this regard, in some embodiments, the configuration application 210 may be configured to command or otherwise instruct one or more media presentation devices 104 to download a counterpart application (e.g., from a remote server) via a communications network (e.g., the Internet or the like). In some embodiments, the configuration application 210 may be utilized to provide or install the code or software package for the counterpart application on media presentation devices 104 detected on the network 106 that do not respond in a manner that indicates the counterpart application is already installed. The counterpart application executing on a media presentation device 104 may facilitate communications with the configuration application 210 to enable the configuration application 210 to configure parameters or settings of the media presentation device 104, as described in greater detail below.

Figure 3:
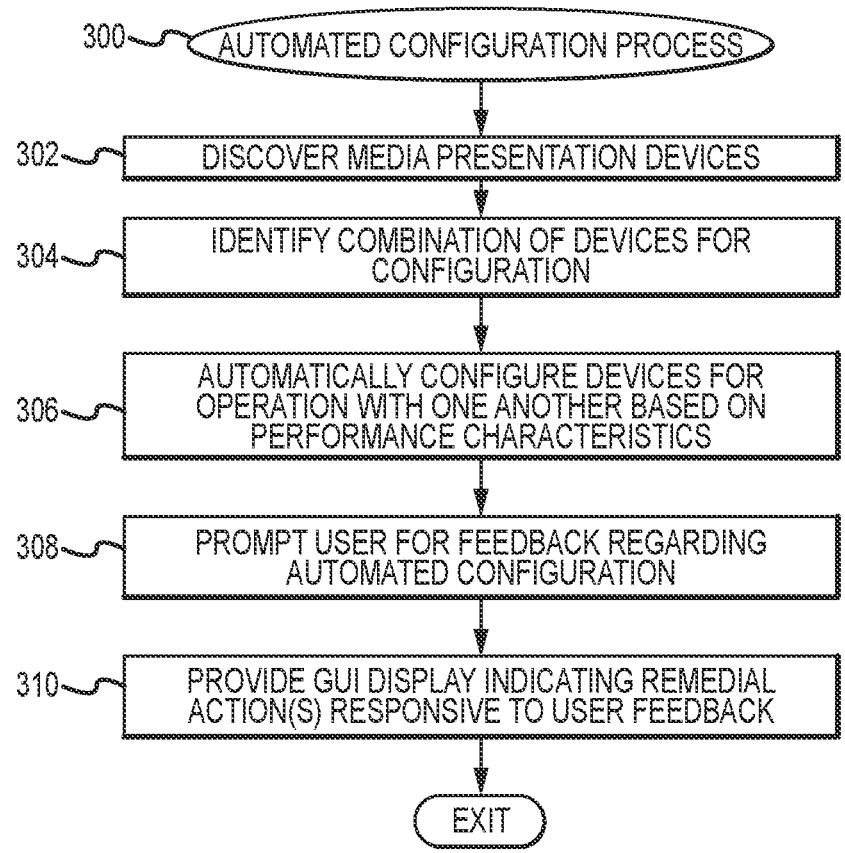
FIG. 3 is a flowchart of an exemplary automated configuration process suitable for implementation by a client device in a media presentation system in accordance with one or more embodiments.

Referring now to FIG. 3, in exemplary embodiments, a client device 102, 200 (or client application 108, 210 executing thereon) in a media presentation system 100 is configured to support an automated configuration process 300 to configure or otherwise setup one or more media presentation devices 104 for compatible operations with one or more other media presentation devices 104 in an automated manner. The various tasks performed in connection with the illustrated process 300 may be implemented using hardware, firmware, software executed by processing circuitry, or any combination thereof. For illustrative purposes, the following description may refer to elements mentioned above in connection with FIGS. 1-2. In practice, portions of the automated configuration process 300 may be performed by different elements of a media presentation system 100. That said, for purposes of explanation, the automated configuration process 300 is described here primarily in the context of being performed by the configuration application 108, 210 at the client device 102, 200. It should be appreciated that the automated configuration process 300 may include any number of additional or alternative tasks, the tasks need not be performed in the illustrated order and/or the tasks may be performed concurrently, and/or the automated configuration process 300 may be incorporated into a more comprehensive procedure or process having additional functionality not described in detail herein. Moreover, one or more of the tasks shown and described in the context of FIG. 3 could be omitted from a practical embodiment of the automated configuration process 300 as long as the intended overall functionality remains intact.

The illustrated automated configuration process 300 initializes or otherwise begins by discovering or otherwise identifying the various devices in a media presentation system that are in the vicinity of the client device or otherwise capable of being configured by the client device (task 302). In one or more embodiments, the configuration application 108, 210 at the client device 102, 200 commands, instructs, or otherwise operates the various wireless communications modules 220, 230, 240 to perform a discovery procedure or otherwise scan their associated network 106 to detect and identify other devices 104 on that network 106. For example, upon the configuration application 210 being opened or initiated, the configuration application 210 may automatically command or instruct the WiFi module 220 to scan for devices on a wireless local area network 106, then command or instruct the PAN module 230 to scan for devices on a personal area network 106, and then command or instruct the NB-IoT module 240 to scan for devices on a NB-IoT network 106. In this regard, the configuration application 108, 210 may exhaustively scan using each of the different types of wireless communications supported by the client device 102, 200 to identify as many different media presentation devices 104 as possible in the vicinity of the client device 102, 200 that are potentially available for configuration.

In response to scanning the network 106, the configuration application 108, 210 may receive information from the detected devices 104 that includes a network address or other network configuration information (e.g., an internet protocol address, a port number, and the like), a device identifier, and potentially other performance characteristics or configurations of the respective device (e.g., supported data rates, encryption information, and/or the like). For media presentation devices 104 executing a client application that supports communications with the configuration application 108, 210, the client application at those devices may also respond to a discovery or probe request from the configuration application 108, 210 at the client device 102, 200 with information identifying the respective make, model, and other information about its device type. Otherwise, the configuration application 108, 210 at the client device 102, 200 may utilize the information from a response to a discovery or probe request to query the database 114 via the server 112 and identify the device type for a detected device by matching the discovery response information to stored information for a particular device type.

In some embodiments, the configuration application 108, 210 may be capable of automatically identifying the device type for a detected media presentation device 104 based on the networks 106 that the media presentation device 104 is detected on. For example, a media presentation device 104 may be discovered communicating on both a WiFi network 106 and a PAN 106, and the configuration application 108, 210 may be unable to identify the device based on its discovery response on the WiFi network 106 but the discovery response on the PAN 106 may enable the configuration application 108, 210 to identify the device, or vice versa. Moreover, in some embodiments, the configuration application 108, 210 may be capable of automatically determining the device type for a detected media presentation device 104 based on the combination and type of networks 106 that the detected device 104 is discovered along and the corresponding identification information or configuration information associated with those different networks 106. For example, the configuration application 108, 210 may determine a device type for a detected device 104 based on the combination of a particular port number used by the device 104 on a first type of wireless network 106 and another port number used by the device 104 on a different type of wireless network 106.

In one or more embodiments, after scanning the various networks 106 available to the client device 102, 200, the configuration application 108, 210 generates or otherwise provides a GUI display on the display device 206 that includes a listing of the detected media presentation devices 104 and their associated device type information. In this regard, for detected devices 104 that the configuration application 108, 210 is unable to identify based on the discovery response information, the configuration application 108, 210 may generate one or more GUI elements on the display device 206 that prompt a user of the client device 102, 200 to manipulate the user input device 208 to input or otherwise provide the device type information for those devices. Additionally, the user of the client device 102, 200 may utilize one or more GUI elements to input information identifying additional media presentation devices 104 that may not have been detected by the configuration application 108, 210. In some embodiments, the configuration application 108, 210 may also be configured to support identifying media presentation devices 104 by scanning identifying information on those media presentation devices 104 via a scanner, reader, or similar interface of the client device 102, 200. For example, the client device 102, 200 may include a barcode reader or scanner that is operable using the configuration application 108, 210 to scan or read a barcode, quick response (QR) code, universal product code (UPC), or other coding on a media presentation device 104. The configuration application 108, 210 may then utilize the scanned code to query the server 112 to obtain device type information and performance characteristics associated with the scanned media presentation device 104.

After discovering media presentation devices available for configuration, the automated configuration process 300 continues by identifying or otherwise determining which combination of media presentation devices are coupled to one another or otherwise interoperate with one another (task 304). In one or more embodiments, the configuration application 108, 210 may automatically identify device pairings using logic rules, machine learning, or other artificial intelligence. For example, if the configuration application 108, 210 only identifies a single television in the media presentation system 100, the configuration application 108, 210 may automatically determine that any detected set-top box, streaming stick, or other media player that produces video output is paired with the television for presenting media content on the television. Similarly, if the configuration application 108, 210 only identifies a single audio/video receiver in the media presentation system 100, the configuration application 108, 210 may automatically determine that any detected speakers, soundbars, or other audio output devices are paired with the receiver for reproducing the audio portion of media content from the receiver. In some embodiments, the configuration application 108, 210 generates or otherwise provides a GUI display on the display device 206 that provides indications of the device pairings for review or modification by the user. In this regard, the user may manipulate GUI elements provided by the configuration application 108, 210 to modify device pairings or pair media presentation devices 104 that were not automatically paired by the configuration application 108, 210.

In exemplary embodiments, the automated configuration process 300 continues by automatically configuring paired devices for interoperation with one another based on the performance characteristics associated with the respective devices (task 306). In this regard, the configuration application 108, 210 modifies or configures one or more parameters or settings of a media presentation device 104 to improve compatibility with another media presentation device 104 based on their performance characteristics, or vice versa. For example, the configuration application 108, 210 may modify configurable parameters of a media presentation device 104 having higher performance capabilities than its paired media presentation device 104 to match the performance characteristics of its paired media presentation device 104. As another example, the configuration application 108, 210 may configure a media presentation device 104 to only attempt to download or retrieve types of media content supported by its paired media presentation device 104. In one or more exemplary embodiments, the configuration application 108, 210 attempts to configure media presentation devices 104 of each identified pairing to maximize compatibility of paired media presentation devices 104 within the media presentation system 100, and thereby optimize the setup or configuration of the media presentation system 100 as a whole. For various media presentation devices 104, the configuration application 108, 210 may query the database 114 via the server 112 to retrieve performance characteristics associated with a respective media presentation device 104, which, in turn, are utilized to configure the respective media presentation device 104 or its paired media presentation device 104. In this regard, for media presentation devices 104 that provide performance characteristics as part of the discovery procedure (e.g., at task 302), the configuration application 108, 210 may attempt to obtain additional performance information from a remote server 112 to supplement the performance characteristics for those devices 104.

In one or more embodiments, the steps of detecting available media presentation devices (task 302), pairing the detected media presentation devices (task 304), and configuring the paired media presentation devices (task 306) may be performed in an entirely automated manner without any intervening manual interaction. For example, upon a user opening or initiating execution of the configuration application 108, 210 on the client device 102, 200 the configuration application 108, 210 may automatically scan the available wireless networks 106 to detect media presentation devices 104 of the media presentation system 100. Thereafter, the configuration application 108, 210 may automatically pair detected media presentation devices 104, and then for each pairing, analyze the performance characteristics associated with the respective media presentation devices 104 of that pairing to automatically configure the pairings of media presentation devices 104. For example, for each pairing of media presentation devices 104, the configuration application 108, 210 may automatically obtain the performance characteristics associated with the respective media presentation devices 104 (e.g., via the discovery procedure, from a counterpart application executing on the media presentation device 104, from the remote server 112 and/or database 114, and the like). The configuration application 108, 210 then compares performance characteristics associated with the respective media presentation devices 104 and modifies one or more parameters or settings of one of the media presentation devices 104 to match or otherwise correspond to the performance characteristics associated with its paired media presentation device 104. Once the configuration application 108, 210 finishes automatically detecting, pairing, and configuring media presentation devices 104, the configuration application 108, 210 may generate a GUI display that summarizes the automated configuration, for example, by listing the media presentation devices 104 that were detected and configured. In this regard, the GUI display may indicate which media presentation devices 104 were paired together and/or the manner in which the media presentation devices 104 were automatically configured.

Still referring to FIG. 3, in one or more embodiments, after configuring paired media presentation devices, the automated configuration process 300 generates or otherwise provides one or more GUI displays that prompt the user of the client device to input information pertaining to the automated configuration of the media presentation system (task 308). Based on the received user input, the automated configuration process 300 generates or otherwise provides recommendations, suggestions, or other feedback pertaining to the configuration of the media presentation system responsive to the user input (task 310). For example, the configuration application 108, 210 may provide a GUI display that summarizes the automated configuration of the media presentation devices 104 and includes GUI elements that prompts the user to confirm satisfaction with the automated configuration or provide additional input regarding what aspects of the automated configuration were unsatisfactory or what additional objectives the user would like to achieve. In this regard, the user may provide input indicating particular media presentation devices 104 that may be exhibiting unsatisfactory performance or what aspects of media presentation the user would like to improve (e.g., video quality, audio quality, streaming quality, or the like). Based on the input received from the user, the configuration application 108, 210 may analyze performance characteristics associated with the relevant media presentation devices 104 and potentially other information pertaining to the user's ability to receive media content (e.g., subscription information for the user) to identify potential remedial actions for improving media presentation or otherwise achieving the user's input objective(s) and then generate a GUI display that presents those potential remedial actions to the user.

By way of example, in one embodiment, the media presentation devices 104 detected on the wireless network 106 by the configuration application 108, 210 could include a television, a media device coupled to the television (e.g., a set-top box or a streaming media device), and another intermediary device between the media device and a source of media content (e.g., the Internet, a satellite distribution network, or the like). For example, the configuration application 108, 210 could detect a router configured to receive media content from the Internet or another telecommunications network, a television, and a streaming media device coupled to the router and the television (e.g., task 302). The configuration application 108, 210 may then identify the router and streaming media device as a first pair of media presentation devices and the streaming media device and the television as a second pair of media presentation devices (e.g., task 304).

For the pairing of router and streaming media device, the configuration application 108, 210 obtains their respective performance characteristics, either from the devices directly (e.g., from a counterpart configuration application executing thereon) and/or from a remote database 114, and then compares or otherwise analyzes the performance characteristics to automatically determine how to configure the router and streaming media device for compatible operation (e.g., task 306). If the streaming media device supports 4K video resolution but the router does not support data rates beyond 1080p video resolution, the configuration application 108, 210 determines that the streaming media device should not request video resolutions above 1080p and then automatically configures the streaming media device via the network 106 so that the streaming media device does not attempt to stream media content with resolutions higher than 1080p. For example, a video quality setting at the streaming media device may be changed from a default setting of highest resolution available to 1080p video quality so that the streaming media device by default does not attempt to stream media content with a video resolution that will not be supported by the data rate available from the router.

Similarly, for the pairing of the streaming media device and the television, the configuration application 108, 210 obtains their respective performance characteristics, either from the devices directly and/or from a remote database 114, and then compares or otherwise analyzes the performance characteristics to automatically determine how to configure the streaming media device for compatible operation with the television. For example, if the television only supports standard definition, the configuration application 108, 210 may determine that the streaming media device should not request video resolutions above 480i and then automatically configures the streaming media device via the network 106 so that the streaming media device does not attempt to stream media content with resolutions higher than 480i. Thus, the default video quality setting at the streaming media device may be configured to limit unnecessary overhead or consumption of network bandwidth that could otherwise result from requesting higher resolution media content that is unsupported by the television and/or the router. In other words, in terms of performance, the configuration application 108, 210 may automatically configure the configurable performance parameters or settings detected media presentation devices that interoperate to present media content for the lowest common denominator in terms of performance capabilities across those devices. Additionally, the configuration application 108, 210 may determine which file types or formats are supported by the television and automatically configure the streaming media device to only request or download those file types, or alternatively, to automatically transcode media content received at the streaming device into a particular file format supported by the television.

After automatically configuring the router, streaming media device and the television for compatible operations with one another, the configuration application 108, 210 may generate or otherwise provide a GUI display that indicates to the user what video resolution the media presentation system is configured to support via those devices. In this regard, if the user is unsatisfied with the configured video resolution, the user may provide input indicative of a desire by the user to achieve a better video resolution. For example, in one embodiment, the television may support 8K resolution, but the data rate at the router does not support a video resolution better than 4K, and the streaming media device may not support a video resolution better than 1080p. Thus, the configuration application 108, 210 may automatically configure the devices to support streaming media content with 1080p video resolution. However, the user may know that the video resolution supported by the television is greater than what is currently configured and provide input indicative of a desire to achieve the 8K resolution. In response, the configuration application 108, 210 may analyze the performance characteristics of the router and the streaming media device to identify how the user can improve video resolution and present the remedial action(s) to the user. For example, the configuration application 108, 210 may provide a GUI display that indicates the user should update the streaming media device to a different type of streaming media device that supports a better video resolution rather than modifying the router or the user's subscription Internet service because the video presentation is more constrained by the streaming media device. Thus, a relatively unsophisticated user can be apprised of the best way to improve the media presentation experience so that the user does not waste money on actions that will not achieve the desired objective (e.g., upgrading the user's Internet subscription when the desired video resolution still will not be supported by the streaming media device).

Similarly, if the user's router or some other intermediary device (e.g., a firewall device) is constraining presentation of higher quality media content, the configuration application 108, 210 may provide a GUI display that indicates how the user could improve data rates to the streaming media device. For example, the configuration application 108, 210 could provide a recommendation of an upgraded subscription Internet package that would support a higher video resolution, or provide an indication of the minimum data rate required at the router to support a desired video resolution. Additionally or alternatively, in the case of a firewall device, the configuration application 108, 210 could provide instructions or suggestions about how to configure the firewall device to improve the video quality. In this regard, in some embodiments, the configuration application 108, 210 could automatically configure a firewall device via the network 106 (e.g., at task 306), while in other embodiments, the configuration application 108, 210 may refrain from automatically configuring any detected firewall devices until receiving a confirmation or instruction from the user to do so. Likewise, if the configuration application 108, 210 detects a proxy server being utilized by the user that constrains the quality of media presentation, the configuration application 108, 210 could automatically configure various media presentation devices 104 to avoid using the proxy server, or alternatively, the configuration application 108, 210 may refrain from automatically avoiding use of the proxy server and merely do so upon manual confirmation. In yet other embodiments, the configuration application 108, 210 may provide suggestions or recommendations for how the user could manually configure the media presentation devices 104 or networks to avoid use of a constraining proxy server.

As yet another example, the configuration application 108, 210 could detect a satellite receiver configured to receive media content from a satellite distribution network, a television, and a set-top box coupled between the satellite receiver and the television (e.g., task 302). The configuration application 108, 210 may then identify the satellite receiver and the set-top box as a first pair of media presentation devices and the set-top box and the television as a second pair of media presentation devices (e.g., task 304). In a similar manner as described above, the configuration application 108, 210 may automatically configure the media presentation device pairings for compatible operations, for example, by automatically configuring video quality parameters or settings of one or more of the devices for the lesser of the highest video qualities supported by the respective devices. In a similar manner as described above, the configuration application 108, 210 may generate or otherwise provide a GUI display that indicates to the user what video resolution the media presentation system is configured to support via those devices, and if the user is unsatisfied with the configured video resolution, the configuration application 108, 210 may utilize the performance characteristics associated with the media presentation devices to determine one or more remedial action(s) for improving video resolution.

For example, if the user is using an outdated or legacy set-top box that does not support a video resolution above 1080p while the user's television is capable of presenting 4K video resolution and the satellite receiver is capable of receiving 4K media content, the configuration application 108, 210 may provide a GUI display that indicates that the user should inquire with user's satellite provider about updating the user's set-top box. Conversely, if the user's subscription information obtained from a remote database 114 indicates that the satellite receiver is unable to receive or process channels supporting 4K video resolution, the configuration application 108, 210 may provide a GUI display that indicates that the user should inquire with user's satellite provider about upgrading the user's subscription to include 4K video content. As yet another example, if the user's subscription information and performance characteristics associated with the satellite receiver and set-top box indicate the user is capable of receiving 4K video content but the user's television only supports 1080p video resolutions, the configuration application 108, 210 may provide a GUI display that suggests that the user upgrade the television to support higher resolution content. In such embodiments, the configuration application 108, 210 may also automatically configure the satellite receiver and/or set-top box to optimize receiving and presenting video resolutions up to 1080p and modify one or more video quality parameters or settings at the satellite receiver and/or the set-top box to eschew attempts to receive, decode, or otherwise present 4K video content on the television.

It should be noted that the above are merely some examples of media presentation devices 104 that could be automatically detected and configured pursuant to the automated configuration process 300, and the subject matter described herein is not limited to any particular type or number of media presentation devices 104 that may be configured. In this regard, though the above examples focus on video quality, the automated configuration process 300 may be implemented in an equivalent manner for audio content quality. For example, if the audio presentation devices 104 detected by the configuration application 108, 210 do not support surround sound or other higher quality audio features, the configuration application 108, 210 may automatically configure a streaming media device, a set-top box, or other media device coupled to the audio presentation devices 104 to eschew requesting, receiving, and/or processing such higher quality audio content to reduce overhead, conserve bandwidth or other computing resources, and the like. Moreover, in various other embodiments, the automated configuration process 300 may be utilized to configure various devices on an NB-IoT network 106 for interoperation when presenting media content, for example, by synchronizing or coordinating operations of lighting arrangements, climate control arrangements (e.g., heating devices, air conditioning devices, and the like), sensors, and potentially other devices with presentation of media content on a television, speakers, or other playback device within an environment where those other devices are present.

In various embodiments, the automated configuration process 300 may also be utilized to improve communications between media presentation devices 104. For example, a given pair of media presentation devices 104 may be capable of communicating with one another via different wireless networks 106. In this regard, based on the data rates supported by the paired media presentation devices 104 and the bandwidths or throughputs associated with the different wireless networks 106, the configuration application 108, 210 may automatically configure the paired media presentation devices 104 to communicate over a particular wireless network 106 using particular communications parameters or settings to maximize the data rate for providing media content from one of the media presentation devices 104 to the other media presentation device 104. For example, the configuration application 108, 210 may identify a maximum data rate supported by each of the media presentation devices 104, and then configure the media presentation devices 104 to communicate via a wireless network 106 with configured communications settings that achieve the lesser of the two maximum data rates or otherwise achieves the maximum achievable data rate given the available wireless networks 106. For example, the configuration application 108, 210 may configure the media presentation devices 104 to communicate with one another over an NB-IoT network 106 rather than a WiFi network 106 to achieve a better data rate. As another example, the configuration application 108, 210 may configure the media presentation devices 104 to communicate using particular port numbers or other networking settings that to achieve the maximum data rate supported by the paired media presentation devices 104.

Figure 4:
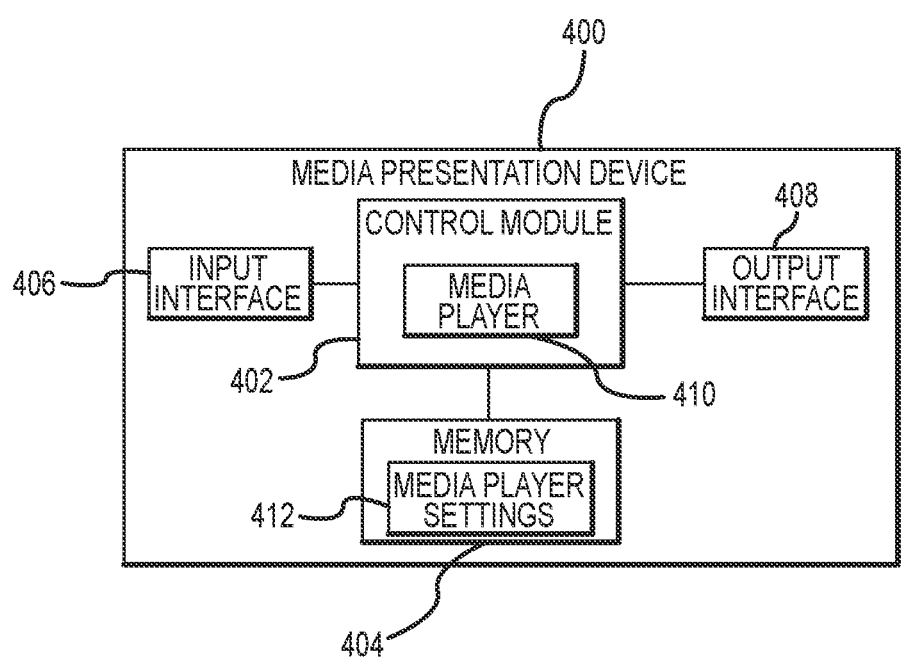
FIG. 4 depicts a block diagram of an exemplary embodiment of a media presentation device suitable for use in the media presentation system of FIG. 1 in connection with the automated configuration process of FIG. 3.

FIG. 4 depicts an exemplary electronic device 400 suitable for use as one or more of the media presentation devices 104 in the media presentation system 100 of FIG. 1. The illustrated media presentation device 400 includes a control module 402, one or more data storage elements 404, an input interface 406 and an output interface 408.

The control module 402 represents the processing system, processing device, hardware, firmware, and/or other components or combinations thereof configured to support the subject matter described herein. The control module 402 may include one or more processors, central processing units (CPUs), graphics processing units (GPUs), controllers, microprocessors, microcontrollers, processing cores and/or other computing resources. The data storage element (or memory) 404 is coupled to or otherwise accessed by the control module 402, and the data storage element 404 may include any sort of random access memory (RAM), read only memory (ROM), flash memory, magnetic or optical mass storage, or any other suitable configuration of non-transitory short or long term data storage or other non-transitory computer-readable media capable of storing data or other programming instructions for execution by the control module 402. In one or more embodiments, the stored programming instructions, when read and executed by the control module 402, cause the control module 402 to generate a media player application 410 that supports performance of the various tasks, functions, and/or processes and the operations of the media presentation device 400 described herein. In some embodiments, the control module 402 is implemented as a "system on a chip" (SoC) that incorporates a hybrid microcontroller with memory, input/output and other features to perform the various processing and other functionality of media presentation device 400, and in which case a separate memory 404 may not be provided.

The input interface 406 is coupled to the control module 402 and generally represents the hardware, circuitry, logic, firmware and/or other components of the media presentation device 400 that are configured to receive media content from a communications network, another media presentation device, or other content source (e.g., a satellite distribution network, a cable distribution network, or the like). Similarly, the output interface 408 is coupled to the control module 402 and generally represents the hardware, circuitry, logic, firmware and/or other components of the media presentation device 400 that are configured to output or otherwise provide the media content to a display device, an audio device, or another media presentation device. In this regard, depending on the particular type of media presentation device 400, the output interface 408 could graphically present, render, or otherwise display imagery and/or video corresponding to media content received by the media presentation device 400 via the input interface 406. In some embodiments, the output interface 408 could also generate sound or otherwise reproduce the audio corresponding to the audio portion of the media content.

Referring to FIG. 4 with reference to FIG. 1, in some embodiments, one of the interfaces 406, 408 may be realized as a communications interface or network interface that supports communications via a network 106. That said, in other embodiments, the media presentation device 400 may include a communications interface in addition to interfaces 406, 408, where the communications interface includes or otherwise represents the hardware, circuitry, logic, firmware and/or other components of the media presentation device 400 that are configured to support communications via one or more networks 106. In this regard, media presentation device 400 may include one or more of a WiFi communications module, a PAN module, a NB-IoT module, or any other sort or combination of wireless transceiver modules capable of supporting wireless communications.

Still referring to FIG. 4, in the illustrated embodiment, the media player 410 generally represents the component of the media presentation device 400 that receives and processes media content received from the input interface 406 prior to providing the media content to the output interface 408. In this regard, in various embodiments, the media player 410 could include one or more buffers, decoders, encoders, transcoders, and/or the like. In one or more embodiments, the media player 410 processes media content received at the media presentation device 400 in accordance with one or more configurable parameters or settings 412 maintained in the memory 404.

Referring to FIG. 4 with reference to FIGS. 1-3, in exemplary embodiments, one or more of the media player settings 412 are automatically configured or modified by the configuration application 108, 210 for compatibility with another instance of a media presentation device 104, 400 coupled to one of the input/output interfaces 406, 408 in accordance with the automated configuration process 300. For example, the media player settings 412 may be configured to alter the data rate associated with media content received and/or processed by the media player 410. In one or more embodiments, the media player settings 412 include a default content quality setting which may be configurable by the configuration application 108, 210 to automatically set the resolution or quality of media content requested by the media player 410 via the input interface 406, or alternatively, to set the quality of media content output by the media player 410 via the output interface 408.

In some embodiments, the media player 410 may be configured to support communications with the configuration application 108, 210 via the network 106. In yet other embodiments, the media presentation device 400 may be configured to download or otherwise retrieve a counterpart configuration application supporting communications with the configuration application 108, 210 from a remote server or other device via a telecommunications network. In such embodiments, the memory 404 may store corresponding programming instructions that, when read and executed by the control module 402, cause the control module 402 to generate a configuration application that supports automated configuration of the media player settings 412 via communications with configuration application 108, 210 as described above in the context of FIGS. 1-3.

Figure 5:
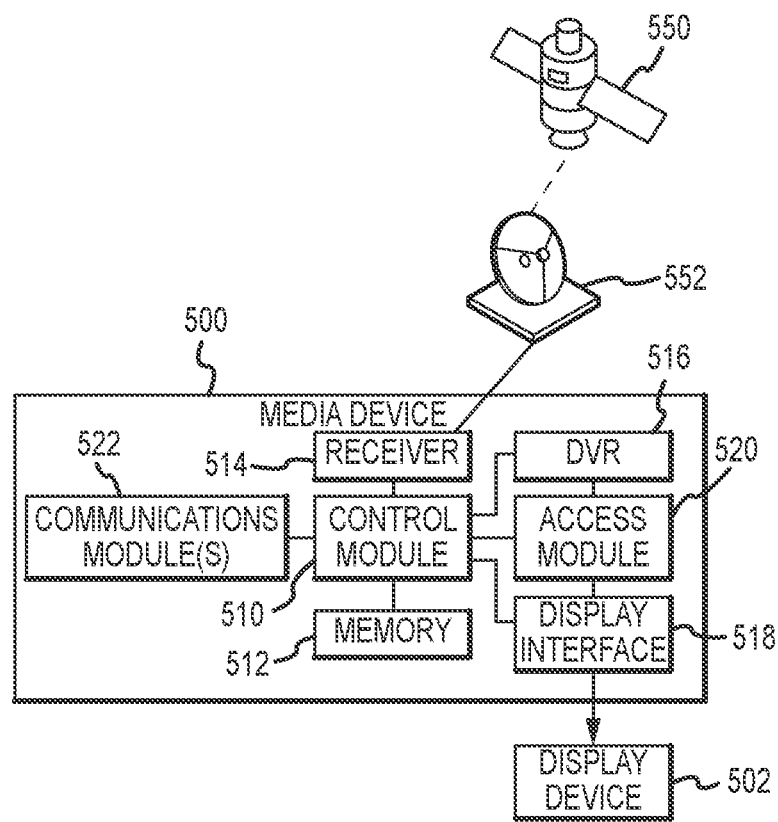
FIG. 5 depicts a block diagram of an exemplary embodiment of a media device, such as a set-top box, which is suitable for use as a media presentation device in the media presentation system of FIG. 1 in connection with the automated configuration process of FIG. 3.

FIG. 5 depicts an exemplary embodiment of a media device 500 suitable for use as a media presentation device 104 in the media presentation system 100 of FIG. 1. In one or more exemplary embodiments, the media device 500 is realized as a set-top box capable of receiving and processing media content and providing media content to a television or other media presentation device 104 for presentation. In some embodiments, the media device 500 may also be configured to support placeshifting media content to another device via a communications network.

In one or more exemplary embodiments, the media device 500 includes a receiver interface 514 for receiving satellite, cable and/or broadcast programming signals from broadcast content sources 550, as well as a data storage medium 516 (e.g., a hard disk, flash memory, or another suitable non-volatile data storage element) to support a digital video recorder (DVR) feature and/or functionality, and a display interface 518 for providing imagery and/or video corresponding to a media program to a display device. For convenience, but without limitation, the data storage medium 516 is alternatively referred to herein as a DVR. In some embodiments, the media device 500 may also include an access module 530, such as a card interface or card reader adapted to receive a smart card or the like, which is configured to ensure that the viewer is authorized to view media content received from the content source 550. In this regard, the access module 530 may include unique identification information associated with a particular subscriber to a broadcast distribution network 550 or otherwise include authorization (or subscription) information that facilitates receiving and/or decoding media content received from the broadcast distribution network 550. Equivalent embodiments, however, could receive programming from any sort of cable connection, broadcast source, removable media, network service, external device and/or the like. It should be appreciated, however, that the subject matter described herein is not necessarily limited to implementation or use with media devices including such an access module. The illustrated media device 500 also includes one or more communications modules 522 configured to support communications to/from the media device 500. In this regard, the media device 500 includes at least one wireless communications module configured to support wireless communications.

It should be appreciated that FIG. 5 depicts merely one exemplary embodiment of a media device 500, and in practice, the media device 500 may be physically and/or logically implemented in any manner to suit the needs of a particular embodiment. In this regard, in some embodiments, the components in media device 500 may be provided within a common chassis or housing as illustrated in FIG. 5, although equivalent embodiments may implement media device 500 with any number of inter-connected but discrete components or systems. For example, in some embodiments, the media device 500 may be realized as a combination of a STB and a placeshifting device, wherein some features of the media device 500 are implemented by the STB and other features of the media device 500 are implemented by the placeshifting device, wherein the placeshifting device works in conjunction with the STB to shift the viewing experience from a home television.

In the illustrated embodiment, media device 500 is capable of receiving digital broadcast satellite (DBS) signals transmitted from a broadcast source 550, such as a satellite, using an antenna 552 that provides received signals to the receiver 514. Equivalent embodiments, however, could receive programming at receiver 514 from any sort of cable connection, broadcast source, removable media, network service, external device and/or the like. The DVR 516 feature stores recorded programming (e.g., broadcast programming received via receiver 514) on a hard disk drive, memory, or other storage medium as appropriate in response to user/viewer programming instructions, wherein the recorded programming may be subsequently viewed on display device or placeshifted to another client device via a network. Content stored in DVR 516 may be any sort of file-based programming or other content that is accessible to media device 500. Additionally, media content in DVR 516 may be stored in any sort of compressed or uncompressed format, as desired, and may be encoded or transcoded as desired for effective receipt, storage, retrieval and playing.

The media device 500 includes a control module 510 configured to direct, manage, or otherwise control the operations of the media device 500 as appropriate. The control module 510 may be realized as any suitable combination of hardware, firmware, and/or other components of the media device 500 capable of directing, managing or otherwise controlling the operations of media device 500. The control module 510 may be realized using any suitable processing system, processing device, or combination thereof. For example, the control module 510 may include one or more processors, central processing units (CPUs), graphics processing units (GPUs), controllers, microprocessors, microcontrollers, processing cores and/or other computing resources configured to support the subject matter described herein. The media device 500 also includes a data storage element (or memory) 512 that is coupled to or otherwise accessed by the control module 510. The memory 512 may be realized using as random access memory (RAM), read only memory (ROM), flash memory, magnetic or optical mass storage, or any other suitable configuration of non-transitory short or long term data storage or other non-transitory computer-readable media capable of storing programming instructions for execution by the control module 510. The stored programming instructions, when read and executed by the control module 510, cause the control module 510 to perform various tasks, functions, and/or processes to control operations of the media device 500 and support the subject matter described herein. In some embodiments, the control module 510 is implemented as a "system on a chip" (SoC) that incorporates a hybrid microcontroller with memory, input/output and other features to perform the various processing and other functionality of media device 500, and in which case a separate memory 512 may not be provided.

Referring to FIG. 5 with reference to FIGS. 1-3, it should be noted that various aspects of operation of the media device 500 could be configured by the configuration application 108, 210 in accordance with the automated configuration process 300. For example, the media device 500 may be configured to record or otherwise store media content on the DVR 516 with a video quality that does not exceed the supported video resolution of the television or display device coupled to the media device 500 to conserve memory. In the context of placeshifting, the media device 500 may be configured to default to data rates or video quality that correspond to data rates supported by routers, firewalls, or other devices that may be coupled between the media device 500 and an external network. Moreover, the subscription information obtained by the configuration application 108, 210 from the access module 530 may be utilized to configure other media presentation devices 104 or provide recommendations or suggestions to the user, as described above. It should be noted that there are various different ways in with the media device 500 could be configured by the configuration application 108, 210 in accordance with the automated configuration process 300, and the above examples are not intended to be limiting.

To briefly summarize, the subject matter described herein allows for the various devices in a media presentation system to be configured or otherwise customized for compatible interoperations with respect to other devices coupled thereto in an automated manner that does not require any particular knowledge, expertise or interaction by a user. For example, an individual user may have multiple different streaming media devices coupled to a television and communicating on one or more networks within the user's home. The individual user may desire to view media content on the television via a particular OTT media service but be unsure as to which streaming media devices are capable of supporting the OTT media service, or which of the streaming media devices is optimal for use in presenting the media content. The user may open a configuration application on the user's phone or other client device, which, in turn, causes the client device to scan the various networks available to the client device to identify the different streaming media devices and television. The configuration application may then automatically configure the different streaming media devices for compatible operation with the television and the respective networks they communicate on, and then determine which of the streaming media devices supports the desired OTT media service and which of the streaming media device is capable of presenting content with the best performance (e.g., highest content quality, data rate, etc.) given its configured settings. In some embodiments, if the streaming media device configured to provide the best performance does not have the necessary software for supporting the OTT media service, the configuration application may command or otherwise instruct that streaming media device to download and install the necessary software application from a remote device.

Thereafter, the configuration application may generate a GUI display indicating the automated configuration of the various streaming media devices and include indicia that the particular streaming media device configured to provide the best performance should be utilized for the OTT media service. In some embodiments, the configuration application may automatically command, signal, or otherwise instruct the television to select a particular input coupled to the identified streaming media device for presentation. Conversely, when the streaming media device configured to provide the best performance is unable to support the OTT media service, the configuration application may provide indicia that the best performing of the streaming media devices capable of supporting the OTT media service should be utilized and/or instruct the television to select its associated input. Additionally, the configuration application may provide feedback, recommendations, or suggestions for improving performance of the selected streaming media device (e.g., by connecting the selected streaming media device to a different network), upgrading or replacing the selected streaming device, or for modifying or enabling the streaming media device configured to provide the best overall performance to support the OTT media service (e.g., disabling a firewall to allow the streaming media device to download the OTT media service software application).

It should be noted that while the subject matter may be described herein in the context of device pairings for purposes of explanation, in some embodiments, the automated configuration process 300 may be performed in a combinatorial manner. For example, the presentation devices 104 in a media presentation system 100 may include a streaming media device capable of providing video independently of audio, a receiver device coupled to the streaming media device to route the video and audio, and one or more wireless speakers capable of receiving the audio content from the receiver device. The streaming media device and receiver device may each be capable of supporting high quality or high data rate video and audio, while the wireless speaker(s) are only capable of supporting lower quality or lower data rate audio. If the streaming media device and receiver device pairing were configured independently of the receiver device and wireless speaker(s) pairing, the streaming media device may be configured to provide high quality video along with high quality audio to the receiver device, while the receiver device may be configured to provide only lower quality audio to the wireless speaker(s). As a result, the streaming media device may waste bandwidth or resources by providing high quality audio to the receiver device that is not supported by the wireless speaker(s). Hence, in a combinatorial implementation, multiple downstream presentation devices may be considered when configuring presentation devices throughout the media presentation system. In other words, upstream devices that reroute or retransmit content to downstream presentation devices may be configured to support the lowest common configurable parameters or settings across the various downstream presentation devices that are directly or indirectly coupled to that upstream device.

For example, continuing the above example, the streaming media device may be configured to provide high quality video along with lower quality audio to the receiver device rather than allocating bandwidth or resources to providing high quality audio to the receiver device, thereby freeing up those resources for buffering, processing, or otherwise transmitting the higher quality video. Conversely, if the receiver device were coupled to a television or other display device that only supported lower quality video while the speakers coupled to the received device supported high quality audio, the streaming media device may be configured to provide lower quality video along with higher quality audio to the receiver device, thereby optimizing resource allocation at or associated with the streaming device based on the downstream presentation devices.

It should be noted that the general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

For the sake of brevity, conventional techniques related to broadcasting, streaming, networking, wireless communications, content distribution or delivery, communications standards or protocols, encoding/decoding standards or protocols, content formats, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments the various block components shown in the figures may be equivalently realized by any number of components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. An automated process performed by a computing device operating on a wireless network to configure a media receiver device separate from the computing device that receives media content and that encodes the media content for transmittal and presentation by a display device, the method comprising:
   detecting, by the computing device on the wireless network, the media receiver device that receives and encodes the media content and the display device that receives the encoded media content from the media receiver device for presentation on a display, wherein the display device has performance characteristics including a maximum video quality;
   detecting, by the computing device, the performance characteristics associated with the display device including the maximum video quality; and
   automatically configuring, by the computing device via the wireless network, the media receiver device for operation with the display device in a manner that is limited by the performance characteristics associated with the display device so that the media receiver device alters the received media content to a video quality that is equal to or less than the maximum video quality supported by the display device, wherein automatically configuring the media receiver device comprises the computing device transmitting instructions to the media receiver device to change a video quality setting of the media receiver device to a video resolution supported by the display device.

2. The automated process of claim 1, wherein the detecting comprises the computing device communicating with the display device to request the performance characteristics of the display device.

3. The automated process of claim 1, wherein the automatically configuring comprises the computing device automatically configuring the media receiver device to limit the encoding of the media content with video quality that is equal to or less than the maximum video quality of the display device.

4. The automated process of claim 1, wherein the detecting comprises the computing device communicating with the display device to identify a model of the display device, and then providing the model of the display device to a network service available via the wireless network to obtain the performance characteristics associated with that model of display device.

5. The automated process of claim 1, further comprising:
discovering, by the computing device, a plurality of media presentation devices on the wireless network, the plurality of media presentation devices including the media receiver device and the display device; and
automatically identifying, by the computing device, that the media receiver device and the display devices are already paired to interoperate with one another prior to the automatically configuring of the media receiver device for operation with the display device.

6. The automated process of claim 5, further comprising:
obtaining, at the computing device, media receiver device type information associated with the media receiver device; and
obtaining, at the computing device, display device type information associated with the display device, wherein the automatically identifying that the media receiver device and the display device are paired comprises automatically determining that the display device is coupled to the media receiver device based on the media receiver device type information and the display device type information using one or more logic rules.

7. The automated process of claim 1, wherein:
the media receiver device comprises a streaming media device that transcodes received television broadcasts; and
the automatically configuring the media receiver device for operation with the display device comprises the computing device:
automatically changing, via the wireless network, a video quality setting at the streaming media device from a default setting to the maximum video quality of the display device so that the streaming media device does not attempt to stream the media content with resolutions higher than the maximum video quality supported by the display device.

8. The automated process of claim 7, wherein:
the performance characteristics further include a file format supported by the display device; and
the automatically configuring the media receiver device for operation with the display device comprises the computing device automatically configuring the streaming media device to transcode the media content into the file format supported by the display device.

9. The automated process of claim 1, further comprising identifying, by the computing device, second performance characteristics associated with a third device coupled to the media receiver device, wherein:
the media receiver device comprises a streaming media device;
the third device comprises a television, the television supporting a television video quality that is different from the maximum video quality of the display device; and
wherein the automatically configuring the media receiver device for operation with the display device comprises the computing device:
automatically changing, via the wireless network, a video quality setting at the streaming media device from a default setting to a lesser of the television quality supported by the television and the maximum video quality supported by the display device.

10. The automated process of claim 1, wherein transmitting instructions to the media receiver device comprises transmitting instructions to alter a configuration of the media receiver device to match the performance characteristics of the display device.

11. The automated process of claim 10, wherein transmitting the instructions comprises transmitting the instructions to change the video quality setting at the media receiver device from a default setting to the video resolution supported by the display device.

12. The automated process of claim 1, wherein:
the media receiver device comprises a streaming media device;
automatically configuring the media receiver device for operation with the display device comprises the computing device transmitting instructions to the streaming media device so that the streaming media device does not attempt to stream the media content with resolutions higher than the maximum video quality supported by the display device.

13. The automated process of claim 1, wherein:
the media receiver device comprises a streaming media device; and
the performance characteristics comprise a file format supported by the display device; and
automatically configuring the media receiver device for operation with the display device comprises the computing device transmitting instructions to the streaming media device to transcode the media content received at the streaming media device into the file format supported by the display device.

14. The automated process of claim 1, wherein the computing device is a mobile phone.

15. The automated process of claim 14 wherein the mobile phone is configured to execute a software application to perform the automated process.

16. A data processing system having a processor, non-transitory data storage and an interface to a wireless network, wherein the non-transitory data storage comprises computer-executable instructions stored thereon that, when executed by the processor perform an automated process comprising:
detecting, by the data processing system on the wireless network, a media receiver device separate from the data processing system that receives and encodes media content and a display device that receives the encoded media content from the media receiver device for presentation on a display, wherein the display device has performance characteristics including a maximum video quality;
detecting, by the data processing system, the performance characteristics of the display device including the maximum video quality; and
automatically configuring, by the data processing system via the wireless network, the media receiver device for operation with the display device in a manner that is limited by the performance characteristics associated with the display device so that the media receiver device alters the received media content to a video quality that is equal to or less than the maximum video quality supported by the display device, wherein automatically configuring the media receiver device comprises the data processing system transmitting instructions to the media receiver device to change a video quality setting of the media receiver device to a video resolution supported by the display device.

17. The data processing system of claim 16 wherein the data processing system is a mobile telephone that executes an application stored in the non-transitory data storage to perform the automated process.

18. The data processing system of claim 17 wherein the media receiver device is a media encoder that receives digital television broadcasts for transcoding and transmission via the wireless network to the display device, and wherein the automatically configuring comprises transmitting configuration instructions to the media encoder instructing the media encoder to limit the transcoding of the received digital television broadcasts to the maximum video quality supported by the display device.

19. A data processing system having a processor, non-transitory data storage and an interface to a wireless network, wherein the non-transitory data storage comprises computer-executable instructions stored thereon that, when executed by the processor perform an automated process comprising:

detecting, by the data processing system on the wireless network, a media receiver device separate from the data processing system that receives and encodes a plurality of media content and a display device separate from the data processing system that receives the encoded media content from the media receiver device for presentation on a display, wherein the display device has performance characteristics including a maximum video quality;

detecting, by the data processing system, the performance characteristics of the display device including the maximum video quality; and automatically configuring, by the data processing system via the wireless network, the media receiver device to limit which of the plurality of media content the media receiver device requests to receive based on the performance characteristics associated with the display device so that the media receiver device only provides the media content having a video quality that is equal to or less than the maximum video quality supported by the display device, wherein automatically configuring the media receiver device comprises the data processing system transmitting instructions to the media receiver device to change a video quality setting of the media receiver device to a video resolution supported by the display device.

* * * * *